(12) United States Patent
Barbu

(10) Patent No.: US 12,246,713 B2
(45) Date of Patent: Mar. 11, 2025

(54) CRUISE CONTROL ALGORITHM FOR INCREASING FUEL EFFICIENCY

(71) Applicant: GM GLOBAL TECHNOLOGY OPERATIONS LLC, Detroit, MI (US)

(72) Inventor: Decebal Catalin Barbu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 18/355,669

(22) Filed: Jul. 20, 2023

(65) Prior Publication Data

US 2025/0026343 A1    Jan. 23, 2025

(51) Int. Cl.
*B60W 30/14*    (2006.01)
*B60W 50/10*    (2012.01)

(52) U.S. Cl.
CPC .......... *B60W 30/143* (2013.01); *B60W 50/10* (2013.01); *B60W 2520/10* (2013.01); *B60W 2520/16* (2013.01); *B60W 2710/0666* (2013.01); *B60W 2710/083* (2013.01); *B60W 2720/10* (2013.01)

(58) Field of Classification Search
CPC .............. B60W 30/143; B60W 50/10; B60W 2520/10; B60W 2520/16; B60W 2710/0666; B60W 2710/083; B60W 2720/10
USPC .......................................................... 701/93
See application file for complete search history.

(56) References Cited

U.S. PATENT DOCUMENTS

| 2014/0277987 | A1* | 9/2014 | Rogalski | B60W 30/143 701/93 |
| 2019/0375394 | A1* | 12/2019 | Maleki | B60W 20/11 |
| 2022/0219691 | A1* | 7/2022 | Maleki | G06F 11/079 |
| 2023/0067494 | A1* | 3/2023 | Westover | B60W 30/143 |

FOREIGN PATENT DOCUMENTS

| DE | 102010018335 A1 | 10/2011 |
| DE | 102010030346 A1 | 12/2011 |
| DE | 102012210317 A1 | 12/2013 |
| DE | 102015224435 A1 | 6/2017 |
| DE | 102016214822 A1 | 2/2018 |
| DE | 102020103644 A1 | 9/2020 |

* cited by examiner

*Primary Examiner* — B M M Hannan
(74) *Attorney, Agent, or Firm* — Lorenz & Kopf LLP

(57) ABSTRACT

A cruise control algorithm including receiving a set speed and a minimum speed, generating a first control signal indicative of a first engine torque request, controlling a vehicle to maintain the set speed in response to the first engine torque request, detecting a vehicle pitch, detecting the vehicle speed, generating a second control signal indicative of the first engine torque request in response to the vehicle pitch being greater than zero degrees and the vehicle speed being greater than the minimum speed, controlling the vehicle to maintain a first engine torque in response to the first engine torque request, generating a third control signal indicative of a second engine torque request in response to the vehicle pitch being greater than zero degrees and the vehicle speed being less than the minimum speed, and controlling the vehicle to maintain the minimum speed in response to the third engine torque request.

20 Claims, 4 Drawing Sheets

300

CRUISE CONTROL ALGORITHM FOR INCREASING FUEL EFFICIENCY

INTRODUCTION

The present disclosure generally relates to vehicles and more particularly relates to methods, systems, and apparatuses for reducing a vehicle fuel consumption during cruise control operations, and more particularly, a method and apparatus for maintaining a vehicle torque request during an uphill climb until a minimum speed is reached or a road grade reduction is reached.

Cruise control is a system that automatically controls the speed of an automobile. The system is a servomechanism that takes over the throttle of the car to maintain a steady speed as set by the driver. Cruise control typically activated via a user input. Once activated, the driver can set the desired speed by pressing the plus or minus buttons. The system will then maintain that speed, even if the road surface is uneven or if the car is going uphill or downhill. Cruise control can be a great way to reduce driver fatigue on long journeys. It can also help to improve fuel efficiency, as the car will be able to maintain a steady speed without having to accelerate or brake as often. However, there are some situations where cruise control should not be used, such as in stop-and-go traffic, on slippery roads, or in areas with frequent speed limit changes. In addition, since cruise control is set to a specific speed, on hilly terrain, a typical cruise control system may experience poor fuel economy as the system will use more fuel going up hills and brake coming down hills to maintain the specific speed.

Cruise control allows a vehicle to automatically adjust its speed to maintain a specific speed based on a user input speed. However, with currently available conventional cruise control systems, in the absence of other proximate vehicles, the ACC controller is programmed to maintain the set cruise control speed irregardless of current road grade or other environmental conditions. For example, when driving uphill, the vehicle experiences an increase in rearward force due to gravity which causes the vehicle to slow down, so the cruise control system will need to apply more throttle to maintain the set speed. In some instances, this increase in throttle may be accompanied by a transmission downshift resulting in a higher engine rotational speed. Using cruise control on hills or winding roads can cause the system to force multiple transmission shifts, which could lead to overheating of the transmission fluid and premature component wear. This changing engine speed and/or transmission shifts may be annoying to a driver and may cause a significant reduction in fuel efficiency of the vehicle. Thus, it is desirable to address these problems to provide a fuel efficient cruise control system. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are driver assistance vehicle control methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for performing a cruise control algorithm, for detecting a positive vehicle pitch, for maintaining a previous engine torque, for detecting a vehicle speed being less than a minimum speed and for generating a subsequent engine torque in response to the vehicle speed being less than a minimum speed and the vehicle pitch being greater than zero degrees.

In at least one exemplary embodiment, a method for controlling a vehicle speed including receiving, from a user interface, a set speed and a minimum speed, generating a first control signal indicative of a first engine torque request, controlling a vehicle to maintain the set speed in response to the first engine torque request, detecting a vehicle pitch, detecting the vehicle speed, generating a second control signal indicative of the first engine torque request in response to the vehicle pitch being greater than zero degrees and the vehicle speed being greater than the minimum speed, controlling the vehicle to maintain a first engine torque in response to the first engine torque request, generating a third control signal indicative of a second engine torque request in response to the vehicle pitch being greater than zero degrees and the vehicle speed being less than the minimum speed, and controlling the vehicle to maintain the minimum speed in response to the second engine torque request.

In accordance with another aspect of the disclosure, wherein the set speed is received from a user interface in response to a user input.

In accordance with another aspect of the disclosure, wherein the set speed is determined in response to a vehicle speed during activation of a cruise control system.

In accordance with another aspect of the disclosure, wherein the vehicle speed is controlled by a vehicle controller in response to the first engine torque request, the second engine torque request.

In accordance with another aspect of the disclosure, wherein the minimum speed is received from a user interface in response to a user input.

In accordance with another aspect of the disclosure, wherein the minimum speed is a percentage of the set speed and is determined in response to a user input received before an activation of a cruise control algorithm.

In accordance with another aspect of the disclosure, wherein the minimum speed is determined in response to a maximum allowable speed reduction determined in response to a user input received before an activation of a cruise control algorithm.

In accordance with another aspect of the disclosure, wherein the minimum speed is a default value stored in a memory during a vehicle factory initiation.

In accordance with another aspect of the disclosure, further including deactivating an air conditioning compressor in response to the vehicle pitch being greater than zero degrees and the vehicle speed being greater than the minimum speed and less than the set speed.

In accordance with another aspect of the disclosure, a cruise control system including a user interface for receiving a set speed and a minimum speed, a pitch sensor for detecting a vehicle pitch, a speed sensor for detecting a vehicle speed, a processor for generating an engine torque request, and a vehicle controller for controlling the vehicle speed in response to the engine torque request.

In accordance with another aspect of the disclosure, wherein the set speed is received from a user interface in response to a user input.

In accordance with another aspect of the disclosure, wherein the set speed is determined in response to a vehicle speed during activation of a cruise control system.

In accordance with another aspect of the disclosure, wherein the vehicle speed is controlled by a vehicle controller in response to the first engine torque request, the second engine torque request.

In accordance with another aspect of the disclosure, wherein the minimum speed is received from a user interface in response to a user input.

In accordance with another aspect of the disclosure, wherein the minimum speed is a percentage of the set speed and is determined in response to a user input received before an activation of a cruise control algorithm.

In accordance with another aspect of the disclosure, wherein the minimum speed is determined in response to a maximum allowable speed reduction determined in response to a user input received before an activation of a cruise control algorithm.

In accordance with another aspect of the disclosure, wherein the minimum speed is a default value stored in a memory during a vehicle factory initiation.

In accordance with another aspect of the disclosure, further including deactivating an air conditioning compressor in response to the vehicle pitch being greater than zero degrees and the vehicle speed being greater than the minimum speed and less than the set speed.

In accordance with another aspect of the disclosure, a vehicle control system including identify, by the processor, a target vehicle operating in the host vehicle environment and quantifying a set of target vehicle parameters about the target vehicle derived from sensed inputs, model, by the processor, a state estimation of the host vehicle and the target vehicle by generating a set of speed and torque calculations about each vehicle, generate, by the processor, a set of results from at least one reward function based on one or more modeled state estimations of the host and the target vehicle, and correlate, by the processor, the set of results with driver behavior data adapted by RL to one or more control actions to the driver behavior data.

In accordance with another aspect of the disclosure, wherein the minimum speed is received from a user interface in response to a user input and wherein the minimum speed is at least one of a user defined speed, a percentage of the set speed, and the set speed minus a maximum speed loss.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
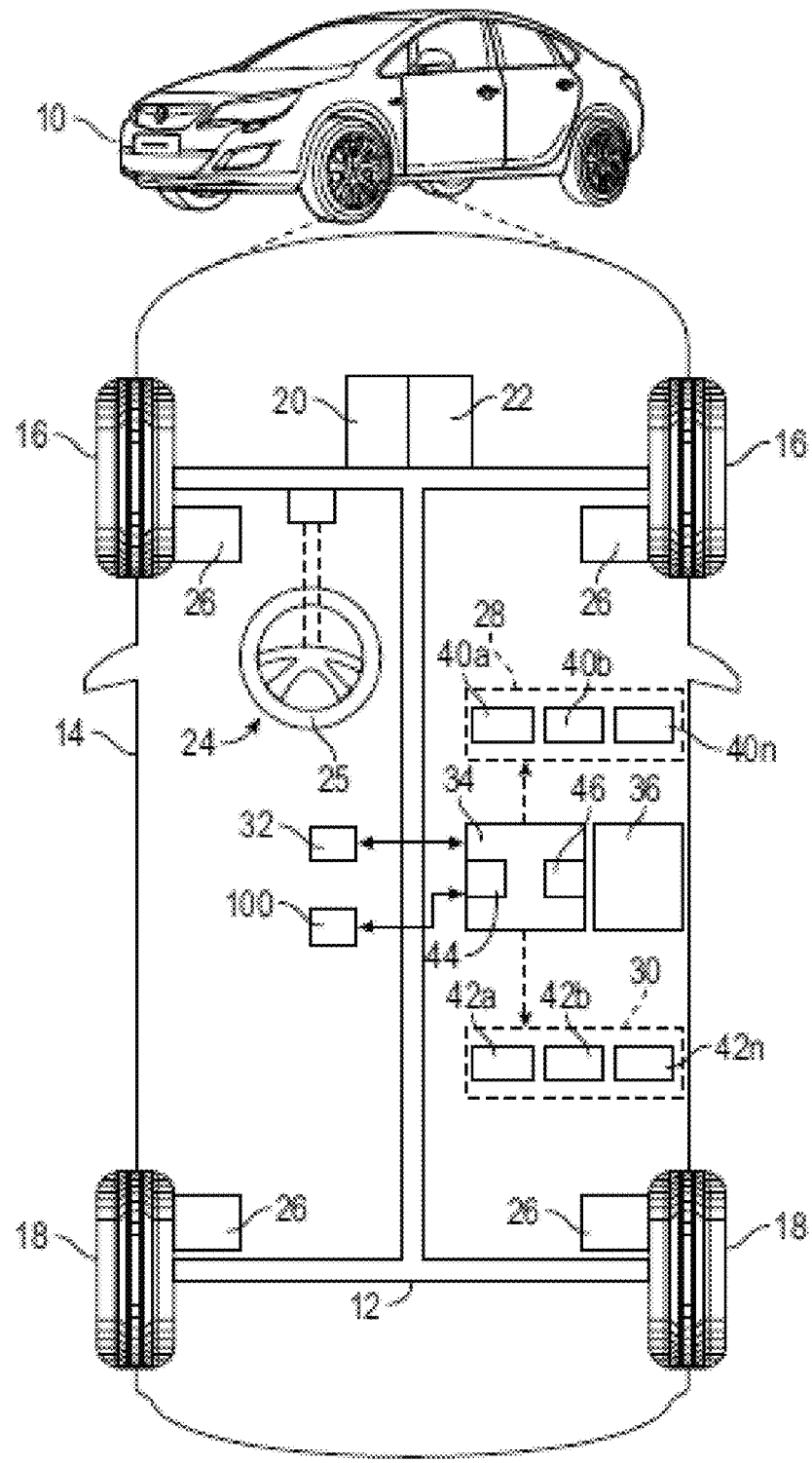
FIG. 1 is a functional block diagram illustrating an autonomous or semi-autonomous vehicle having a control system that controls vehicle actions in response to a cruise control algorithm and a vehicle pitch in a vehicle control system, in accordance with exemplary embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) established by Reinforcement Learning (RL) which is or can be stored in a DNN type model that controls operation in response to data from vehicle inputs, for example, as described in greater detail further below in connection with FIGS. 2-4.

In various exemplary embodiments, system 100 provides a process using an algorithm that controls torque and speed in a host vehicle's 10 embedded controller software of the system 100 allowing DNNs to be used for an ACC behavior prediction model. The system 100 enables learning of driver's preference for following distance for different target vehicles such a target vehicle and to classify driver's preference based on driving scenarios; e.g., traffic signs, stop and go traffic, city driving, etc. The system 100 using a Q-matrix can build a knowledge base for target vehicles following performance preference by utilizing online and historical driver and environmental information.

As depicted in FIG. 1, vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, vehicle 10 is autonomous or semi-autonomous, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network 33) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally also includes a propulsion system 20, a transmission system 22, a brake system 26, one or more user input devices 27, a sensor system 28, an actuator system 30, at least one data storage device 32, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes a vehicle controller that will be directly affected based on the neural networks 33 model's output. In an exemplary embodiment, a feed-forward operation can be applied for an adjustment factor that is the continuous output of the neural network 33 models to generate a control action for the desired torque or other like action (in case of a continuous neural network 33 models, for example, the continuous APC/SPARK prediction values are outputs).

In various embodiments, one or more user input devices 27 receive inputs from one or more passengers (and driver 11) of the vehicle 10. In various embodiments, the inputs include a desired destination of travel for the vehicle 10. In certain embodiments, one or more input devices 27 include an interactive touch-screen in the vehicle 10. In certain embodiments, one or more input devices 27 include a speaker for receiving audio information from the passengers. In certain other embodiments, one or more input devices 27 may include one or more other types of devices and/or maybe coupled to a user device (e.g., smartphone and/or other electronic devices) of the passengers.

The sensor system 28 includes one or more sensors 40a-40n that sense observable conditions of the exterior environment and/or the interior environment of the vehicle 10. The sensors 40a-40n include but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, canister purge system 31, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10, including the storing of data of a DNN that is established by the RL, used to predict a driver behavior for the vehicle control. In various embodiments, the data storage device 32 stores a machine learning model of a DNN and other data models established by the RL. The model established by the RL can take place for a DNN behavior prediction model or RL established model. In an exemplary embodiment, no separate training is required for the DNN rather, the DNN behavior prediction model (i.e., DNN prediction model) is implemented with a set of learned functions. In various embodiments, the neural network 33 (i.e., DNN behavior prediction model) may be established by RL or trained by a supervised learning methodology by a remote system and communicated or provisioned in vehicle 10 (wirelessly and/or in a wired manner) and stored in the data storage device 32. The DNN behavior prediction model can also be trained via supervised or unsupervised learning based on input vehicle data of a host vehicle operations and/or sensed data about a host vehicles operating environment.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of controller 34, separate from controller 34, or part of controller 34 and part of a separate system.

Controller 34 implements the logic model established by RL or for the DNN based on the DNN behavior model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
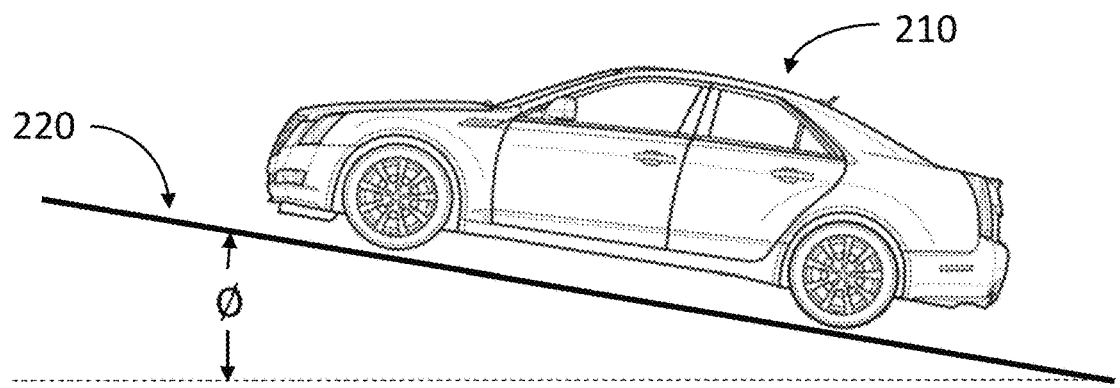
FIG. 2 shows an exemplary environment for use of an enhanced cruise control system, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

Turning now to FIG. 2, an exemplary environment 200 for use of an enhanced cruise control system in accordance with various embodiments is shown. The exemplary environment 200 is illustrative of a vehicle 210 equipped with cruise control and a road surface 220 having a grade of Ø. In some exemplary embodiments, the vehicle 210 may have transitioned from a flat grade while performing a cruise control algorithm with a set speed defined by a driver. To maintain the set speed, the cruise control controller will generate a corresponding engine torque request to couple to the throttle body controller or engine control unit (ECU) such that the set speed is maintained. When the vehicle 210 transitions to the uphill grade, traditionally the cruise control controller must increase the engine torque request to in order to maintain the set speed. Likewise, when the vehicle reaches the crest of a hill, the cruise control controller will need to apply a reduced engine torque and/or an application of the brakes to impede the vehicle momentum downhill to maintain the set speed, thereby further lowering fuel economy.

Cruise control is an electronic system that allows a driver to set a specific speed for their car and then take their foot off the accelerator pedal. The system uses a servomechanism to take over the throttle and maintain a steady speed. Cruise control can be activated via controls on the steering wheel or a user interface. Cruise control can be useful for driving at a constant speed, especially on highways and fast roads with few curves or grade changes. Cruise control can reduce fatigue and stress for the driver, and can also prevent speeding and increase fuel efficiency. However, cruise control may not perform safely and efficiently at night or during bad weather. Likewise, cruise control may result in lower fuel economy when used on roadways with frequent grade changes, such as in hilly areas.

An engine torque command is a signal sent from the driver's throttle to the ECU. It tells the ECU how much torque the driver wants the engine to produce. The ECU then uses this signal to control the fuel injection and ignition timing, in order to achieve the desired torque output. The engine torque command is typically measured in Newton-meters (Nm). For example, a torque command of 100 Nm means that the driver wants the engine to produce 100 Nm of torque. The engine torque command is a critical factor in determining the performance of an engine. If the torque command is too low, the engine will not produce enough power. If the torque command is too high, the engine could overheat or even damage itself. The engine torque command is also used to control the transmission. The transmission uses the torque command to determine how many gears to shift into. For example, if the driver wants to accelerate quickly, the ECU will send a high torque command to the transmission, which will cause it to shift into a lower gear. The engine torque command is a complex signal that is affected by a number of factors, including the driver's throttle position, the engine speed, and the load on the engine. The ECU uses a variety of sensors to measure these factors and then adjusts the torque command accordingly. Factors that can affect the engine torque command include the driver's throttle position, the engine speed, the load on the engine and the engine temperature. The engine torque command is a critical signal that is used to control the performance of an engine.

A cruise control system is set to maintain a constant speed set by the user. This can result in the cruise control controller increasing an engine torque request to maintain this speed while going uphill and braking when going downhill. To improve the fuel economy by going up the hill, it is advantageous to allow the cruise control system to deviate from the cruise control set speeds and keep the torque request constant up to a certain user defined speed limit. The system may first detect a road grade in response to a current vehicle pitch to define if the vehicle is going up the hill, level or downhill. Reducing the speed while going up hill will enable the cruise control system to allow the vehicle speed to be decreased up to the set speed while going up hill, thereby possibly avoiding braking on the downhill descent. A novel user input can be added with an accompanying set of user controls in defining a new setting for a minimum speed. The cruise control algorithm can further include an updated torque control strategy to be used during cruise control operations.

In some exemplary embodiments, the cruise control algorithm will receive a user defined lower speed input indicative of a minimum speed a user will allow the vehicle to reach before an increase in torque is requested. For example, the user may define a minimum speed as 15 miles per hour less than the set cruise control speed. Alternatively, the user may define the minimum speed as a percentage of the set cruise control speed, such as 85% of the set cruise control speed. The cruise control algorithm is then configured to monitor the vehicle pitch via a vehicle pitch sensor or the like. If the pitch sensor is positive, the algorithm will determine the torque request to be kept constant until the min speed user input is reached. If the pitch sensor is positive and the min speed is achieved, the min speed can be maintained until the pitch sensor reports a level value. If pitch sensor is level the normal cruise control operation can be resumed based on the desired acceleration rates. The reduced torque request during a hill climb promotes mileage increase due to lower gas/electric consumption.

Figure 3:
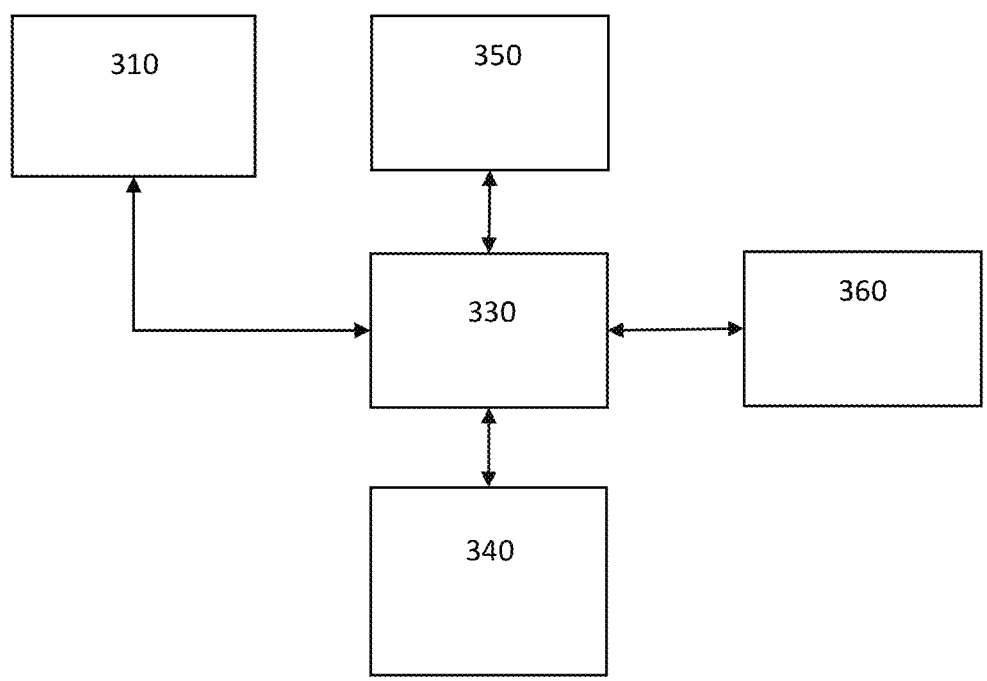
FIG. 3 is a diagram illustrating components of a system implemented using the cruise control fuel efficiency algorithm in accordance with various embodiments illustrated in FIGS. 1-2, in accordance with various embodiments.

With reference now to FIG. 3, a diagram illustrating components of a system 300 implemented using the cruise control fuel efficiency algorithm in accordance with various embodiments illustrated in FIGS. 1-2, in accordance with various embodiments. The exemplary system 300 can include a user input 310, a processor 330, a vehicle controller 350, a pitch sensor 340 and a memory 260.

The exemplary user input 310 can be a steering wheel mounted touch pad, center stack touch pad, or other user interface for receiving a user input 310 indicative of a cruise control activation, a set speed, and a minimum speed. Typically, a driver may activate the cruise control system and algorithm by initiating the cruise control system while driving at the desired set speed. The cruise control system will then use the current speed of the vehicle at the time of activation as the set speed. Alternatively, the driver may depress a resume button or the like and the cruise control system will use a previously stored set speed as the current set speed. This may mean that the controller 330 may generate engine torque requests such that the vehicle increases or decreases speed to transition from the current speed to the requested set speed.

The driver may use the user input 310 to enter a minimum speed. The minimum speed is the lowest speed that a reach while climbing an incline with a constant engine torque request. For example, the driver may enter an exact speed, such as fifty five miles per hour, a maximum reduction in speed, such as ten miles per hour, or a maximum reduction in speed percentage, such as fifteen percent. This minimum speed can be entered by the driver during cruise control configuration prior to vehicle motion. Alternatively, the driver may initiate the cruise control algorithm, such as activating the algorithm while driving at the set speed and may then receive a prompt from the user input 310 to select a minimum speed. The driver may then select the minimum speed by pressing an arrow key on the steering wheel, may turn a job wheel, depressing a level or the like until the minimum speed is indicated. The driver may then confirm the minimum speed through a separate key press or the like. This minimum speed may then be stored in the memory 360 for use by the cruise control fuel efficiency algorithm. In some exemplary embodiments, the cruise control fuel efficiency algorithm may be performed as part of a fuel economy mode of a vehicle and automatically use the user defined minimum speed or a default minimum speed as stored in the memory 360.

The processor 330 can be a component of a cruise control controller, an ECU, a vehicle control system or the like. The processor 330 is configured to perform the cruise control fuel efficiency algorithm in response to initiation of the cruise control system by the driver via the user input 310 and the set speed. The minimum speed may be retrieved by the processor 330 from the memory 360. The processor 330 is configured to generate an engine torque request or similar control signal to couple to the vehicle controller 350. The vehicle controller 350 controls the vehicle throttle body controller or the like such that the vehicle maintains the set speed. In some exemplary embodiments, the vehicle controller 350 can then transmit the current vehicle speed back to the processor 330 for use by the cruise control algorithm. The processor 330 is next operative to receive a vehicle pitch value from the pitch sensor 340. If the vehicle pitch value is indicative of the vehicle climbing a grade, the processor 330 may continue to couple the previous engine torque request to the vehicle controller 350. The processor 350 next receives the current vehicle speed from the vehicle controller 350 and compares the current vehicle speed to the minimum speed. If the current vehicle speed is less than the minimum speed, the processor 330 can then couple an updated engine torque request to the vehicle controller 350 such that the minimum speed is maintained by the vehicle. Alternatively, if the current vehicle speed is less than the minimum speed the processor 330 can couple an updated engine torque request such that the set speed is resumed and the vehicle accelerates from the minimum speed to the set speed while climbing the grade.

In some exemplary embodiments, in response to the vehicle pitch value indicating the vehicle climbing a grade, the processor 330 may continue to couple the previous engine torque request to the vehicle controller 350 and the processor 330 can be further configured to disengage one or more heating and air conditioning components, such as an air conditioning compressor. Disengaging the air conditioning compressor can advantageously reduce the engine torque required to maintain the set speed or can result in the rate of loss of speed of the vehicle as the vehicle climbs the grade at the previous engine torque request. Disengaging one or more heating and air conditioning components in response to the pitch value indicating a vehicle climbing a grade can result in more engine torque being provided to the drive train than was being applied during the level grade with the one or more heating and air conditioning components engaged.

The pitch sensor 340 is configured to detect a current vehicle pitch and to transmit data indicative of the current vehicle pitch to the processor 330 and/or vehicle controller 350. A pitch sensor 340 can be part of a system, such as a six-axis inertial navigation system or an inertial measurement unit (IMU) that detects position, orientation and velocity information by means of accelerometer and gyroscope sensors can use this information to make predictions for the next position, orientation and speed with various algorithms.

Figure 4:
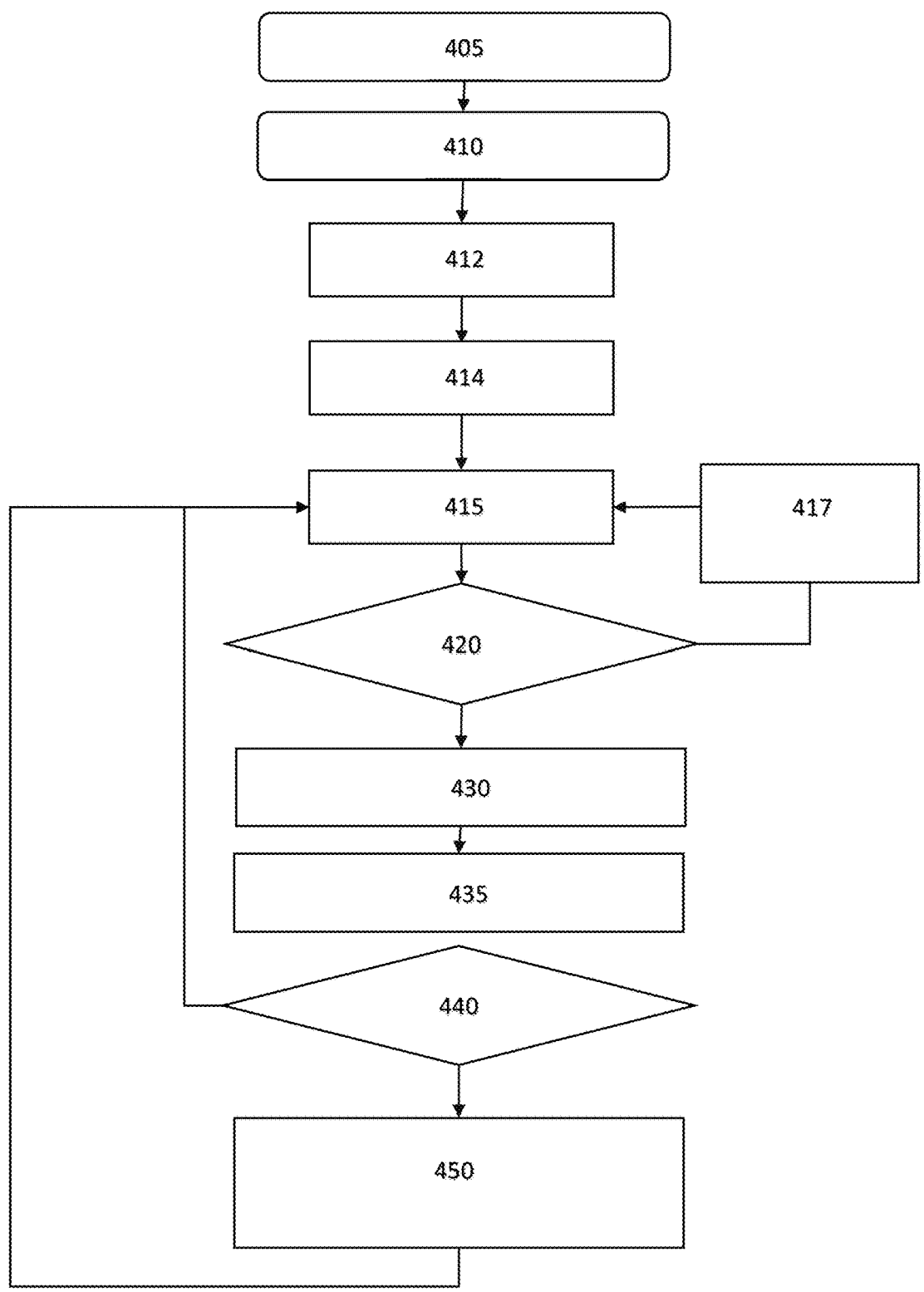
FIG. 4 is a flowchart that illustrates an exemplary method for use of the system implemented using the cruise control fuel efficiency algorithm in accordance with various embodiments illustrated in FIGS. 1-3, in accordance with various embodiments.

FIG. 4 illustrates an exemplary flowchart that illustrates a method 400 for use of the system implemented using the cruise control fuel efficiency algorithm in accordance with various embodiments illustrated in FIGS. 1-3, in accordance with various embodiments. In some exemplary embodiments, the exemplary method is first operative to receive 405 a user input indicative of a minimum speed. The minimum speed may be a percentage of a cruise control set speed or a maximum speed reduction, such as fifteen miles per hour. The user, such as a vehicle driver, may enter or select the minimum speed using a user interface, such as an infotainment display, dashboard display or other user input.

The method is next operative to activate 410 a cruise control algorithm. The cruise control algorithm can be activated in response to a second user input on a user interface, such as a button on a steering wheel. The cruise control algorithm next receives 412 the set speed. In some exemplary embodiments, a set speed for the cruise control algorithm can be a current speed of the vehicle when the cruise control system is activated. Alternatively, or in addition, the user may enter a set speed or increment or reduce the set speed using the user interface.

In response to the activation of the cruise control system and the receiving the set speed, the method is next operative to generate 414 an engine torque request corresponding to the set speed. The engine torque request is indicative of the engine torque required such that the vehicle travels at the set speed. The method next detects 415 a vehicle pitch. If the vehicle pitch is zero degrees or less, an engine torque request is generated 417 such that the set speed is maintained by the vehicle.

If the vehicle pitch is greater than zero degrees 420, indicating that the vehicle is travelling up a hill or an incline, the method then maintains the previous engine torque request. In response to transmitting the previous engine torque request, the method next receives 435 the current vehicle speed. The current vehicle speed can be received from a vehicle controller, or other vehicle sensor or controller. The method next compares 440 the current vehicle speed to the minimum speed. If the current vehicle speed is not less than the minimum speed, the vehicle returns to detecting 415 the vehicle pitch.

If the current vehicle speed is less than the minimum speed, the method is next operative to increase 450 the engine torque request and transmit this increased engine torque request to the vehicle controller. In some exemplary embodiments, the increased engine torque request can result in the vehicle controller maintaining the minimum speed while the vehicle climbs the grade and the pitch remains greater than zero. Alternatively, the increased engine torque request can be indicative of an engine torque required to resume the set speed. After the increased torque request is transmitted to the vehicle controller, the method returns to detecting 415 the vehicle pitch.

It should be appreciated that process of FIGS. 1-4 may include any number of additional or alternative tasks, the tasks shown in FIGS. 1-4 need not be performed in the illustrated order and process of the FIGS. 1-3 may be incorporated into a more comprehensive procedure or process having additional functionality not described in detail herein. Moreover, one or more of the tasks shown in FIGS. 1-3 could be omitted from an embodiment of the process shown in FIGS. 1-4 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for controlling a vehicle speed comprising:
   receiving, from a user interface, a set speed and a minimum speed;
   generating a first control signal indicative of a first engine torque request;
   controlling a vehicle to maintain the set speed in response to the first engine torque request;
   detecting a vehicle pitch;
   detecting the vehicle speed;
   generating a second control signal indicative of the first engine torque request in response to the vehicle pitch being greater than zero degrees and the vehicle speed being greater than the minimum speed;
   controlling the vehicle to maintain a first engine torque in response to the first engine torque request;
   generating a third control signal indicative of a second engine torque request in response to the vehicle pitch being greater than zero degrees and the vehicle speed being less than the minimum speed; and
   controlling the vehicle to maintain the minimum speed in response to the second engine torque request.

2. The method of claim 1, wherein the set speed is received from the user interface in response to a user input.

3. The method of claim 1 wherein the set speed is determined in response to a vehicle speed during activation of a cruise control system.

4. The method of claim 1 wherein the vehicle speed is controlled by a vehicle controller in response to the first engine torque request, the second engine torque request.

5. The method of claim 1 wherein the minimum speed is received from the user interface in response to a user input.

6. The method of claim 1 wherein the minimum speed is a percentage of the set speed and is determined in response to a user input received before an activation of a cruise control algorithm.

7. The method of claim 1 wherein the minimum speed is determined in response to a maximum allowable speed reduction determined in response to a user input received before an activation of a cruise control algorithm.

8. The method of claim 1 wherein the minimum speed is a default value stored in a memory during a vehicle factory initiation.

9. The method of claim 1 further including deactivating an air conditioning compressor in response to the vehicle pitch being greater than zero degrees and the vehicle speed being greater than the minimum speed and less than the set speed.

10. A cruise control system comprising:
    a user interface for receiving a set speed and a minimum speed;
    a pitch sensor for detecting a vehicle pitch;
    a speed sensor for detecting a vehicle speed;
    a processor for generating a first control signal indicative of a first engine torque request in response to the set speed, generating a second control signal indicative of the first engine torque request in response to the vehicle pitch being greater than zero degrees and the vehicle speed being greater than the minimum speed and generating a third control signal indicative of a second engine torque request in response to the vehicle pitch being greater than zero degrees and the vehicle speed being less than the minimum speed; and
    a vehicle controller for controlling the vehicle speed in response to the first engine torque request and the second engine torque request.

11. The cruise control system of claim 10 wherein the set speed is received from the user interface in response to a user input.

12. The cruise control system of claim 10 wherein the set speed is determined in response to a vehicle speed during activation of the cruise control system.

13. The cruise control system of claim 10 wherein the vehicle speed is controlled by the vehicle controller in response to the first engine torque request, the second engine torque request.

14. The cruise control system of claim 10 wherein the minimum speed is received from the user interface in response to a user input.

15. The cruise control system of claim 10 wherein the minimum speed is a percentage of the set speed and is determined in response to a user input received before an activation of a cruise control algorithm.

16. The cruise control system of claim 10 wherein the minimum speed is determined in response to a maximum allowable speed reduction determined in response to a user input received before an activation of a cruise control algorithm.

17. The cruise control system of claim 10 wherein the minimum speed is a default value stored in a memory during a vehicle factory initiation.

18. The cruise control system of claim 10 further including deactivating an air conditioning compressor in response to the vehicle pitch being greater than zero degrees and the vehicle speed being greater than the minimum speed and less than the set speed.

19. A vehicle control system comprising:
a memory for storing a set speed and a minimum speed;
a processor for generating a first control signal indicative of a first engine torque request in response to the set speed, generating a second control signal indicative of the first engine torque request in response to a vehicle pitch being greater than zero degrees and the vehicle speed being greater than the minimum speed and generating a third control signal indicative of a second engine torque request in response to the vehicle pitch being greater than zero degrees and the vehicle speed being less than the minimum speed; and
a vehicle controller for detecting the vehicle pitch and the vehicle speed and for controlling the vehicle speed in response to the first engine torque request and the second engine torque request.

20. The vehicle control system of claim 19 wherein the minimum speed is received from a user interface in response to a user input and wherein the minimum speed is at least one of a user defined speed, a percentage of the set speed, and the set speed minus a maximum speed loss.

\* \* \* \* \*